H. N. BIGGER.
MACHINE FOR PREPARING MATERIAL FOR BARREL MAKING.
APPLICATION FILED MAY 15, 1911.

1,052,790.

Patented Feb. 11, 1913.

6 SHEETS—SHEET 1.

H. N. BIGGER.
MACHINE FOR PREPARING MATERIAL FOR BARREL MAKING.
APPLICATION FILED MAY 15, 1911.

1,052,790.

Patented Feb. 11, 1913.

6 SHEETS—SHEET 2.

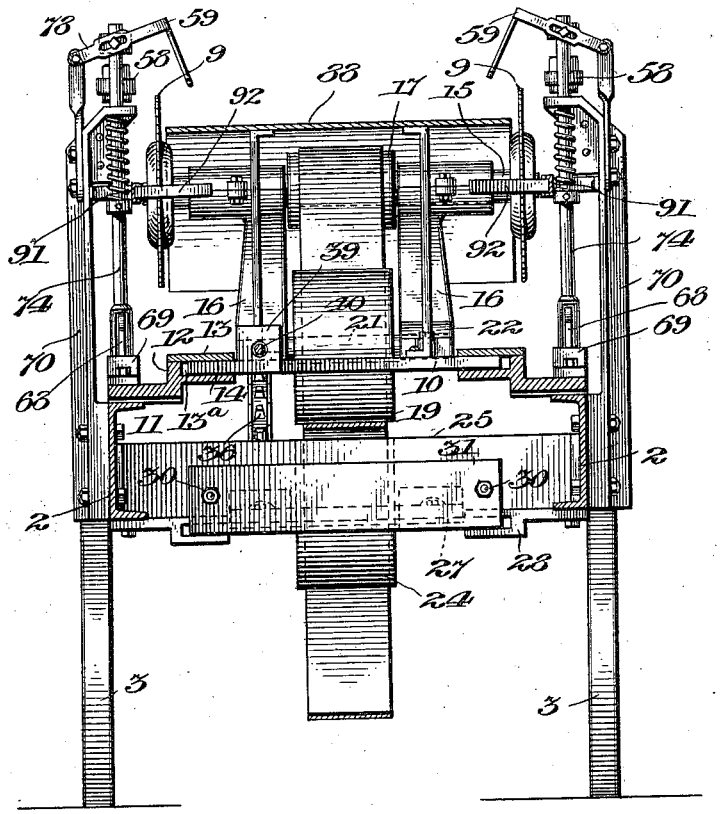

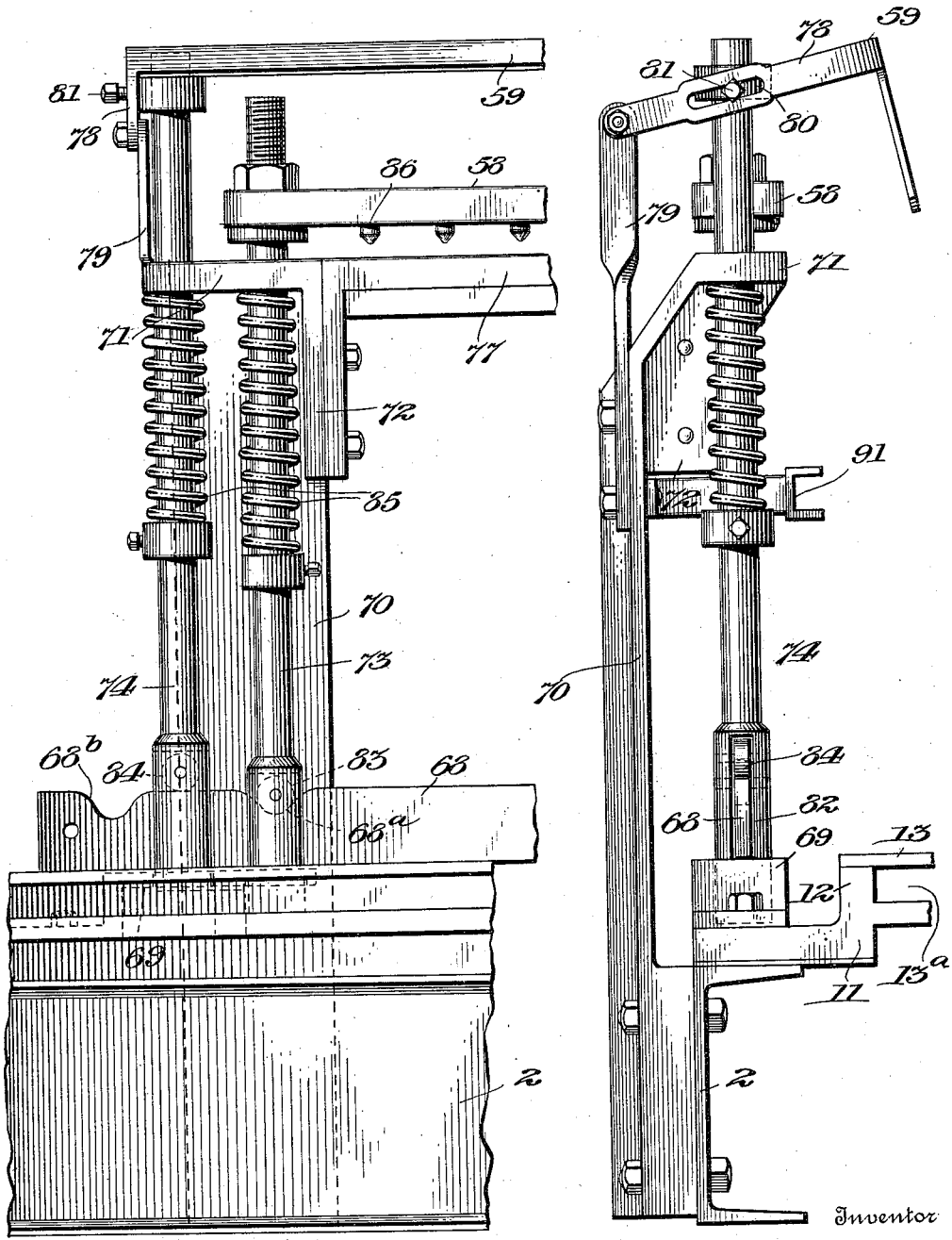

H. N. BIGGER.
MACHINE FOR PREPARING MATERIAL FOR BARREL MAKING.
APPLICATION FILED MAY 15, 1911.
1,052,790.
Patented Feb. 11, 1913.
6 SHEETS—SHEET 5.
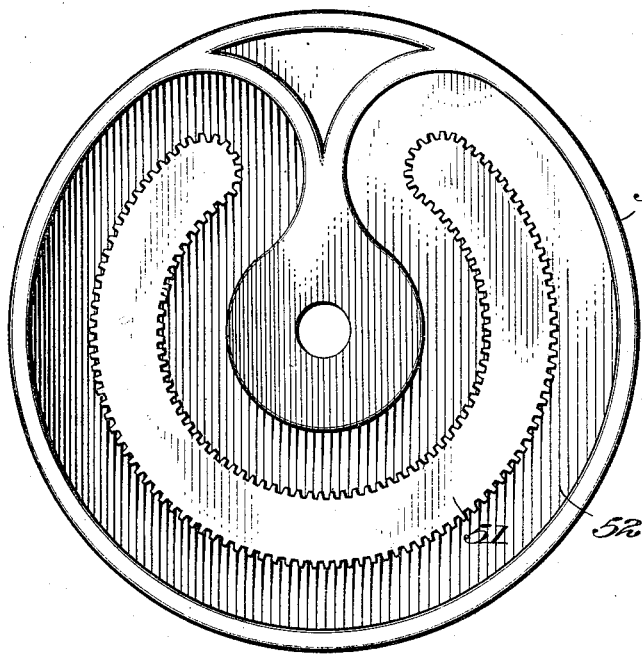
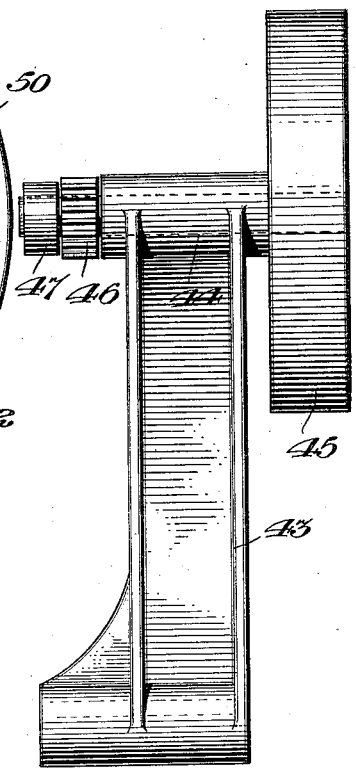
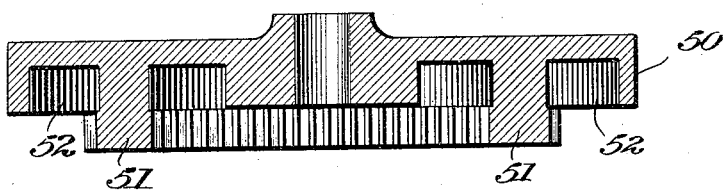

H. N. BIGGER.
MACHINE FOR PREPARING MATERIAL FOR BARREL MAKING.
APPLICATION FILED MAY 15, 1911.

1,052,790.

Patented Feb. 11, 1913.

6 SHEETS—SHEET 6.

Witnesses
Fred A. Klinge

Inventor
Harry N. Bigger
By
Attorney

UNITED STATES PATENT OFFICE.

HARRY N. BIGGER, OF COLLEY TOWNSHIP, SULLIVAN COUNTY, PENNSYLVANIA.

MACHINE FOR PREPARING MATERIAL FOR BARREL-MAKING.

1,052,790.  Specification of Letters Patent. Patented Feb. 11, 1913.

Application filed May 15, 1911. Serial No. 627,333.

*To all whom it may concern:*

Be it known that I, HARRY N. BIGGER, a citizen of the United States, residing in Colley township, in the county of Sullivan and State of Pennsylvania, have invented certain new and useful Improvements in Machines for Preparing Material for Barrel-Making; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in machines for sawing timber into sections of certain width and the improved machine is especially applicable, in the manufacture of heads for barrels and other like receptacles, to the production of the sections from which the heads are formed.

The primary object of the invention is to provide a machine of the character stated, which, by virtue of the novel relation of its instrumentalities and the sequence of its operations, shall be capable of a large output of work in proportion to the degree of power required and the time of its operation.

Other objects and advantages will appear as the description proceeds.

Figure 6:
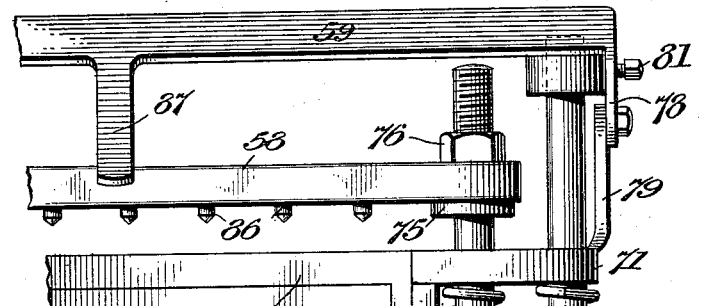
Figure 10:
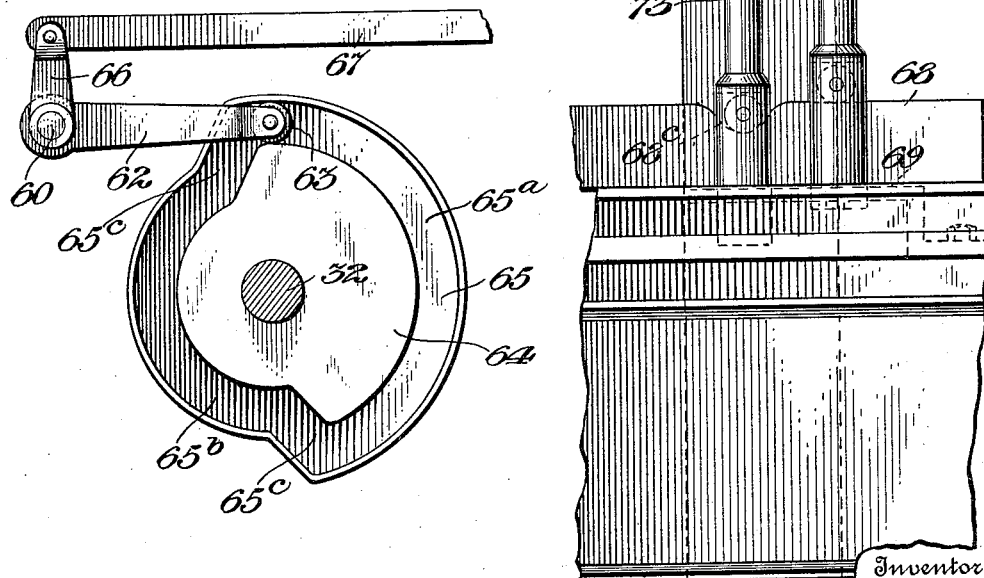

An embodiment of the invention is illustrated in the accompanying drawings wherein:

Figure 1 is a side elevation of a machine of preferred form; Fig. 2 is a plan view thereof with the delivery apron removed; Fig. 3 is a cross-section; Fig. 4 is a detail view showing the connections for operating the clamp and gage bars to be hereafter referred to; Fig. 5 is a detail view in end elevation of the parts shown in Fig. 4; Fig. 6 is a view of parts generally similar to those shown in Fig. 4 but arranged adjacent to the opposite end of the machine; Fig. 7 is a detail elevation illustrating an element of the automatic reversing gear for the carriage driving shaft; Fig. 8 is a detail sectional view of the same; Fig. 9 is a detail plan view of a rocking arm and its appurtenances which form parts of the said automatic reversing gear; Fig. 10 is a detail view showing the cam and rock shaft for operating the clamping and gage bars; Fig. 11 is a detail perspective view of a reciprocatory bar for effecting the operations of clamp and gage bars to be hereafter referred to.

Similar characters of reference designate corresponding parts throughout the several views.

The operating parts are supported by a suitable frame 1 which includes channel iron side bars 2 and is provided with legs 3. The operating parts are driven from a main shaft 4 disposed transversely at the rear end of the frame and supported in hanger bearings 5 which depend from the side bars 2. The shaft 4 is provided with pulleys 6, 7 and 8, the pulley 6 being provided for the driving belt, (not shown).

The machine includes disk saws 9 which are supported from a reciprocatory carriage 10. The latter is supported by plates 11 of suitable extent which are fixed upon the side bars 2 and are provided at a distance from their inner edges with longitudinal flanges 12. Plates 13 are secured on the said flanges for removal therefrom and overhang the inner edge portions of the plates 11, thereby defining channels or ways 13$^a$. The carriage 10 is provided at each side thereof with supporting and guide flanges 14 which interfit and are slidable in the ways 13$^a$.

The saws and their appurtenant instrumentalities are provided in duplicate, being arranged at each side of the frame, in order that the output of the machine may be doubled. The saws 9 are mounted on a transverse shaft 15 which is journaled in upright bearings 16 provided on the carriage 10 and carries a centrally located pulley 17. The carriage 10 is provided at each end thereof with central longitudinal openings 18 to accommodate idler pulleys 19 and 20, arranged on each side of the pulley 17. The pulleys 19 and 20 are mounted on shafts 21 which are journaled in the bearings 22 fixed on the carriage 10. Adjacent to the forward end of the frame a transverse shaft 23 is provided which carries a pulley 24.

The pulleys 7, 17, 19, 20 and 24 are disposed in a common plane and constitute elements of the saw drive which is completed by a belt 25. The latter after it leaves the pulley 7, passes under the pulley 19, over the pulley 17, under the pulley 20, and over the pulley 24 from whence it returns to the pulley 7. In order that the belt 25 may be properly and uniformly tensioned, the shaft 23 which carries the pulleys 24 is mounted upon a bearing bracket 27 which is slidable on ledges 28 secured at the side bar 2, and is pressed forwardly by springs 29. These are of expansive coil type and surround rods 30 carried by fixed parts of the frame, said springs bearing at one end against the heads of said rods and at their other end against an apertured lug 31 provided on the bracket 27 and through which the rods 30 extend. It will be apparent that the arrangement of the pulleys over which the belt 25 passes is of such nature as to provide for the proper driving tension of the belt throughout the reciprocatory movement of the carriage 10.

The carriage 10 is operated in its reciprocatory movement mediately from the shaft 4, the connections embodying automatic reversing gearing, a shaft 32, driven thereby and gearing between the shaft 32 and said carriage. The shaft 32 is disposed transversely between the side bars 2 and in advance of the shaft 4, its support comprising bearings 33 which are set into said side bars. The gearing between the shaft 32 and the carriage 10 comprises a sprocket wheel 34 which is fixed on said shaft, a chain 35 which passes over the sprocket wheel 34 and a sprocket wheel 36 which complements the wheel 34 in supporting the chain. The sprocket wheel 36 is arranged at the extreme forward end of the frame 1 being fixed on a transverse shaft 37 which is journaled in bracket bearings 38 projecting from said frame. The chain 35 is connected to the opposite ends of the carriage 10, the connections being of yieldable nature in order to cushion the shocks and reactions incident to the reversal of the movement of the carriage. For this purpose the carriage is provided at its ends with apertured posts 39 in which are fitted for sliding movement rods 40, having heads or nuts on their inner ends. The outer ends of the rods 40 are connected directly to the adjacent ends of the chain 35. Expansive coil springs 41 are interposed between said posts and the heads or nuts on the inner ends of said rods and serve in an obvious manner, as the shock absorbing medium.

The operative connections between the shaft 32 and the shaft 4 are as follows: One of the side bars 2 is provided with a laterally projecting pin 42 which serves as a pivotal support for a forwardly projecting arm 43, mounted outside of and parallel to the adjacent bar 2. The arm 43 at its forward end is provided with a bearing for a shaft 44 which carries upon its outer end a pulley 45 and upon its inner end a pinion 46 and a roller 47. The pulley 45 is connected by a belt 48 with the pulley 8. The latter is loose on the shaft 4, a suitable clutch 49, preferably a friction clutch being provided to connect and disconnect said shaft and said pulley 8. The shaft 32 has fixed thereon at its end adjacent to the arm 43, a gear wheel 50 which upon its outer face is provided with a laterally projecting segmental rack 51 and with a channel 52 concentric with the rack. The rack 51 is provided throughout its extent with peripheral teeth which are constantly engaged by the pinion 46, while the roller 47 constantly operates in the channel 52. The rack 51 is, in practice, about five-sixths of a circumference in extent in order that the shaft 32 may reverse approximately at each five-sixths of a revolution. It will be apparent that this action is produced by the engagement of the pinion 46 first against one curved face of the rack 51 and then against the opposite face of the rack. It is obvious that as the pinion travels around the ends of the rack in passing from one face to another the arm 43 is rocked on its pivot 42. In order that the rocking movements of said arm may be easy and without jar, it is preferred to employ a suitable tension device, such for instance as a coil spring 53 which is mounted as a resilient hanger for said arm and is, in turn, hung from a bracket 54 provided on the adjacent side bar 2. As a means to reduce loose play between the pinion 46 and the rack 51 it is preferred to mount at the forward end of the arm 43 an upward projection provided with a slot 55 concentric to the pivot of the arm and through which the adjacent end of the shaft 32 projects, said slot having a width which corresponds to the diameter of said shaft. It is also preferred to provide the wheel 50 with a pair of peripheral lugs 56 which as said wheel approaches the limit of its movement in either direction engage respectively against a comparatively strong leaf spring 57 secured to the adjacent side bar 2 and serving to take up any momentum that the wheel may have acquired and which otherwise would prevent an easy reversing action.

The machine also embodies clamp and gage bars which coöperate with the saws and are operated at certain intervals in the movements of the carriage 10. The clamp and gage bars are mounted at each side of the frame and are designated by the numerals 58 and 59 respectively. The connections which effect the operations of these bars are driven from the shaft 32 and are as follows: In the rear of the shaft 32 a transverse rock shaft 60 is provided, the bearings 61 of which are secured upon the bars 2. The shaft 60 has at a suitable point an arm 62 carrying a roller 63. A cam wheel 64 is fixed upon the shaft 32 and is provided in a side face with a cam groove 65 in which the roller 63 operates. The groove 65 includes a larger circularly curved portion $65^a$, a smaller circularly curved portion $65^b$ and connecting rise portions 65ᶜ. The shaft 60 is provided near its ends with arms 66 which are connected by links 67 to slide bars 68. These latter directly effect the operation of the bars 58 and 59 and move on a pair of guide projections 69 which are secured to each of the plates 11. A pair of upright posts 70 is secured to each of the side bars 2 adjacent to the projections 69 and said posts are provided at their upper ends with horizontal lugs 71 and with vertical lugs 72 adjoining the lugs 71. Each lug 71 and the corresponding projection 69 are provided with alining openings through which vertical rods 73 and 74 extend. At each side of the machine the rods 73 have a mean and the rods 74 an extreme relation. Each clamp bar 58 is carried by a corresponding pair of rods 73, the latter having near their upper ends flanges 75 upon which the bar 58 rests. Lock nuts 76 are employed to secure the bars 58 against said flanges. The bars 58 coöperate with adjacent tables 77 which are positioned between each corresponding pair of posts 70 and are bolted to the lugs 72 thereof. The gage bars 59 are parallel to the corresponding clamp bars and are located a suitable distance inwardly of the latter. Said gage bars are provided at their ends with arms 78 which project outwardly and are pivoted at their extremities to extensions 79 secured on the posts 70. The arms 78 are also pivoted to the rods 74, said arms having for this purpose slots 80 and said rods being provided with collars which have pins 81 that extend through said slots. The rods 73 and 74 are provided at their lower ends with vertical slots 82 and with rollers 83 and 84 respectively arranged within said slots at the upper ends thereof. Each of the slide bars 68 aforesaid passes through the corresponding alining slots 82 and is provided at its rear end with two spaced depressions 68ᵃ and 68ᵇ in which the adjacent rollers 83 and 84 are alternately and respectively engaged and at its forward end with a single depression 68ᶜ in which the adjacent rollers 83 and 84 alternately engage. The bars 68 thus produce reciprocatory movements of the rods 73 and 74 and thereby effect the operation of the clamp and gage bars 58 and 59 respectively. The rods 73 and 74 are urged downwardly by expansive coil springs 85 which surround said rods and bear at one end against the lugs 71 and at their other end against collars fixed on said rods. In consideration of their respective functions the bar 58 is provided on its underface with gripping projections 86 and the bar 59 is provided at its inner edge with depending gage fingers 87. It will be understood that the rods 73 are simultaneously lowered and raised and that the movements of the rods 74 are similar. However, when the rods 73 are in their lowered positions the rods 74 are in their raised positions. As the lowered positions of these rods determine the operative relations of the bars 58 and 59 it will be apparent from what has been said that when the bar 58 is in its operative position the bar 59 is in its inoperative position and vice versa. The operative position of the bar 58 is maintained throughout the "sawing" range of each stroke of movement of the carriage 10 and the operative position of the bar 59 is maintained throughout or nearly throughout the "idle" ranges of movement immediately preceding and following the "sawing" range during each stroke of said carriage.

The carriage 10 is provided with an apron 88 which covers the operating parts, thereby serving incidentally the function of a guard and which is provided at its front end with a downward inclined chute 89. When the sections previously cut by the saws, are released by the clamp bars, they drop upon the apron 88, and are subsequently discharged along the chute 89. To effect this action a fixed transverse bar 90 is provided, which overlies the apron and as the latter moves in the rearward direction engages the sections resting on said apron and causes their relative forward movement to the chute 89.

To reduce vibration and promote stability fixed longitudinal bars 91 are supported at each side of the machine by attachment, for example to the posts 70 and the bearings 16 which support the saw carrying shaft 15 are provided with projections 92 which engage in channels provided in said bars 91.

Before proceeding to a résumé of the sequence of operations it is advisable to state in detail the operations of the bars 58 and 59. By reference to Fig. 1 it will be noted that the carriage 10 is approximately midway of the sawing range and that the bars 68 (the drawings only being considered) are at the left hand limit of their movements. With said bars 68 in this position, the rods 73 are in their lowered positions, and the clamp bar 58 is operative, while the rods 74 are in their raised positions and the gage bar 59 is inoperative. It may be noted that the rods 73 adjacent to the rear or left hand end of the machine have their rollers 83 engaged in the depressions 68ᵃ and that the rods 73 adjacent to the forward or right hand ends of the frame have their rollers 83 engaged in the depressions 68ᶜ. If now the bars 68 be shifted to the right the relation of the parts is reversed, the rods 73 being raised and the clamp bar 58 being inoperative and the rods 74 being lowered and the gage bar 59 being operative. In this case the rollers 84 of the bars 74 adjacent to the rear end of the machine engage in the depressions 68ᵇ and the rollers 84 of the bars 74 adjacent the forward end of the machine engage in the depressions 68ᶜ.

The operation of the machine as a whole is as follows, it being understood that the saws 9 revolve continuously. It will be assumed that the carriage 10 is moving to the right from its extreme left hand position. In this movement which is continuous, the carriage first passes through an "idle" range, then through a "sawing" range, and again through a second "idle" range, at the end of which the movement of the carriage is reversed, and in the return stroke the carriage again passes through the three ranges in the order stated. During the movement of the carriage through the idle ranges the bars 58 occupy their raised inoperative positions and the bars 59 occupy their operative positions, being lowered with their fingers 87 in the planes of the adjacent tables 77, a desired distance inwardly of the latter. During the movement of the carriage through the "sawing" range the bars 59 occupy their raised inoperative positions and the bars 58 occupy their operative positions, being lowered so as to clamp the timber which is fed across the tables 77. The last "idle" range of one stroke and the first "idle" range of the following stroke are, in effect, continuous and during this period the operators feed the timber across the tables 77 until the movement of the timber is arrested by the fingers 87 of the gage bar 59. Just before the carriage enters the "sawing" range the bar 59 is raised and the bar 58 is lowered to clamp the timber during the sawing operation as previously explained. The sections produced fall upon the apron 88 and are subsequently discharged along the chute 89 into any suitable receiving medium. It may be noted that as the carriage 10 in its movement from left to right passes from the first "idle" range to the "sawing" range, the bars 68 are shifted from their right to their left hand positions, the roller 63 passing from the cam groove section 65ᵇ through one of the rises 65ᶜ to the cam groove section 65ᵃ and working in the latter throughout the "sawing" range. As the carriage 10 passes from the "sawing" range to the second "idle" range the bars 68 are shifted from their left to their right hand positions, the roller 63 passing from the cam groove section 65ᵃ through the other rise 65ᶜ to the cam groove section 65ᵇ. When the carriage 10 reverses, the first "idle" range of its return stroke is continuous with the last "idle" range of its forward stroke. The cam wheel 64 reverses at the same time as the carriage 10 and as the latter passes into the "sawing" range, the roller 63 moves back through the rise 65ᶜ through which it last passed on the forward stroke of the carriage, passing from the cam groove section 65ᵇ to the cam groove section 65ᵃ and causing the shifting of the bars 68 from right to left. In like manner as the carriage on its return stroke passes from the "sawing" range to the second "idle" range the roller 63 moves back through the rise 65ᶜ through which it first passed on the forward stroke of the carriage, passing from the cam groove section 65ᵃ to the cam groove section 65ᵇ and causing the shifting of the bars 68 from left to right. The parts are then in the relation assumed at the beginning of the description of the operation and the sequence is repeated *ad infinitum*.

If desired, the apparatus may be used as an ordinary disk sawing machine. For this purpose the clutch 49 is operated to disconnect the pulley 8 from the shaft 4 and to thus render inoperative the shaft 32 and the parts operated thereby.

It will be apparent from the foregoing description that the machine is capable of a large output of work, not only because its construction enables a duplication of the operating parts but also because the saws are operative on both the forward and return strokes of the carriage; the feeding of timber although manually effected is automatically provided for during the "idle" ranges of movement of the carriage; the fixing or clamping of the timber is likewise automatically provided for during the "sawing" range of movement of the carriage; and provision is also made for automatically discharging the sections cut by the saws. The machine moreover operates in a rapid and easy manner; and vibration incident to the reversal of the oscillatory and reciprocatory elements is reduced to a minimum.

Having fully described my invention I claim:—

1. In a machine of the type set forth, in combination, a frame, a carriage mounted thereon for reciprocatory movement, a shaft supported by the carriage, a saw carried by the shaft, means for reciprocating the carriage, means for driving the shaft continuously throughout the movement of the carriage, a table adjacent to which the saw moves, a clamp bar for coöperation with the table to hold the timber to be cut, a gage bar for coöperation with the table to limit the feeding movement of the timber across the table, the clamp bar being disposed in its clamping position during the movement of the saw past the table and in its inoperative position during the rest of the movement of the saw, and the gage bar being in its operative position when the clamp bar is in inoperative position and being in inoperative position when the clamp bar is in operative position and mechanism operatively connected with both the clamp and the gage bars for throwing the clamp bars into clamping position and simultaneously throwing the gage bars out of gaging position.

2. In a machine of the type set forth, in combination, a frame, a reciprocatory carriage mounted thereon, a revoluble saw supported by the carriage, a table adjacent to which the carriage and the saw pass, an intermittently operable clamp bar for coöperation with the table to hold the timber to be cut, a gage bar to limit the feeding movement of the timber across the table, the gage bar being operable intermittently and in alternation to the operations of the clamp bar and means operatively connected with both the clamp and the gage bars for intermittently and alternately producing the operations of said clamp and gage bars with relation to the movements of the carriage.

3. In a machine of the type set forth, in combination, a frame, a reciprocatory carriage mounted thereon, a revoluble saw supported by the carriage, a table adjacent to which the carriage and the saw pass, means for reciprocating the carriage, an intermittently operable clamp bar for coöperation with the table to hold the timber to be cut, a gage bar to limit the feeding movement of the timber across the table, the gage bar being operable intermittently and operatively connected with both the clamp and the gage bars and with an element of the carriage reciprocating means for intermittently and alternately producing the operations of said clamp and gage bars with relation to the movements of the carriage.

4. In a machine of the type set forth, a frame, a carriage mounted thereon for reciprocatory movement, a revoluble saw supported from the carriage, a table adjacent which the carriage and the saw pass, intermittently and alternately operable clamp and gage bars for coöperation with the table at definite periods in the movement of the carriage, reciprocatory rods associated severally with said clamp and gage bars to produce the operations thereof, and a reciprocatory bar for controlling the reciprocatory movements of said rods.

5. In a machine of the type set forth, a frame, a carriage mounted thereon for reciprocatory movement, a revoluble saw supported from the carriage, a table adjacent to which the carriage and the saw pass, means for reciprocating the carriage, intermittently and alternately operable clamp and gage bars for coöperation with the table at definite periods in the movement of the carriage, reciprocatory rods associated severally with said clamp and gage bars to produce the operations thereof, and a reciprocatory bar actuated by an element of the carriage reciprocating means for controlling the reciprocatory movements of said rods.

6. In a machine of the type set forth, in combination, a frame, a carriage mounted thereon for reciprocatory movement, a revoluble saw supported from the carriage, a table adjacent which the carriage and the saw pass, intermittently and alternately operable clamp and gage bars for coöperation with the table at the definite periods in the movements of the carriage, reciprocatory rods associated severally with said clamp and gage bars to produce the operations thereof, and an element common to the rods for controlling their reciprocatory movements.

7. In a machine of the type set forth, in combination, a frame, a carriage mounted thereon for reciprocatory movement, a revoluble saw supported from the carriage, a table adjacent which the carriage and the saw pass, intermittently and alternately operable clamp and gage bars for coöperation with the table at definite periods in the movements of the carriage, a common actuating element for said bars, and operative connections between said bars and said actuating element.

8. In a machine of the type set forth, in combination, a frame, a carriage mounted thereon for reciprocatory movement, a revoluble saw supported from the carriage, a table adjacent which the carriage and the saw pass, intermittently and alternately operable clamp and gage bars for coöperation with the table at definite periods in the movements of the carriage, a common actuating element for said bars, operative connections between said bars and said actuating element, a shaft supported from the frame and from which the actuating element is operated, and operative connections between the last named shaft and the carriage to produce the reciprocatory movements of the latter.

9. In a machine of the type set forth, in combination, a frame, a carriage mounted thereon for reciprocatory movement, a revoluble saw supported from the carriage, a table adjacent which the carriage and the saw pass, intermittently and alternately operable clamp and gage bars for coöperation with the table at definite periods in the movements of the carriage, an oscillatory shaft, gearing between the oscillatory shaft and the carriage to produce the reciprocatory movements of the latter, a rock shaft, a cam connection interposed between the oscillatory shaft and the rock shaft, and operative connections between the rock shaft and said clamp and gage bars.

10. In a machine of the type set forth, in combination, a frame, a carriage mounted thereon for reciprocatory movement, a revoluble saw supported from the carriage, a table adjacent which the carriage and the saw pass, intermittently and alternately operable clamp and gage bars for coöperation with the table at definite periods in the movements of the carriage, a reciprocatory bar for effecting the operations of said clamp and gage bars, operative connections between said reciprocatory bar and said clamp and gage bars, an oscillatory shaft, gearing between the oscillatory shaft and the carriage to produce the reciprocatory movements of the latter, a rock shaft, a cam connection interposed between the oscillatory shaft and the rock shaft, and operative connections between the rock shaft and said reciprocating bar.

11. In a machine of the type set forth, in combination, a frame, a carriage mounted thereon for reciprocatory movement, a revoluble saw supported from the carriage, a table adjacent which the carriage and the saw pass, intermittently and alternately operable clamp and gage bars for coöperation with the table at definite periods in the movement of the carriage, a reciprocatory bar for effecting the operations of said clamp and gage bars, operative connections between said reciprocatory bar and said clamp and gage bars, a rock shaft, operative connections between said rock shaft and said reciprocatory bar, a second shaft supported from the frame, gearing between said second shaft and the carriage to produce the reciprocatory movement of the latter, and a cam connection interposed between the rock shaft and the second named shaft to operate the former from the latter.

12. In a machine of the type set forth in combination, a frame, a reciprocatory carriage mounted thereon, a revoluble saw supported from the carriage, a table adjacent to which the carriage and the saw pass and upon which the timber to be cut is held, an apron also supported from the carriage and upon which the sections cut by the saw fall, the apron having one end formed as an inclined delivery chute, and a fixed, transverse bar under which the apron moves and which forces the cut timber sections toward the delivery chute.

13. In a machine of the type set forth, in combination, a frame, a carriage mounted thereon for reciprocatory movement, a revoluble saw supported from the carriage, a table adjacent which the carriage and the saw pass, an intermittently operable bar movable toward and away from the table for coöperation therewith at a definite period in the movement of the carriage, a reciprocatory bar for effecting the operation of the first named bar, the latter and the table being parallel to the axis of movement of the carriage, operative connections between the reciprocatory bar and the first named bar, a shaft supported transversely of the frame operative connections between the reciprocatory bar and the shaft, and gearing between the shaft and the carriage to produce the reciprocatory movement of the latter.

14. In a machine of the type set forth, in combination, a frame, a carriage mounted thereon for reciprocatory movement, a revoluble saw supported from the carriage, a table adjacent which the carriage and the saw pass, an intermittently operable bar movable toward and away from the table for coöperation therewith at a definite period in the movement of the carriage, a reciprocatory bar for effecting the operation of the first named bar, the latter and the table being parallel to the axis of movement of the carriage, the reciprocatory bar having recesses, rods carrying the first named bar and movable, consequent to the movements of the reciprocatory bar into and out of the recesses of the latter, a shaft supported transversely of the frame, and operative connections between said shaft and the reciprocatory bar.

15. In a machine of the type set forth, in combination, a frame, a reciprocatory carriage mounted thereon, a revoluble saw supported from the carriage, a table adjacent to which the carriage and the saw pass and upon which the timber to be cut is held, and an apron also supported from the carriage in a plane parallel to the plane of the table, the saw working between the apron and the table, the sections cut by the saw falling upon the apron and the latter having one end formed as an inclined delivery chute.

In testimony whereof I affix my signature in presence of two witnesses.

HARRY N. BIGGER.

Witnesses:
ELSIE W. MOYER,
RUSH J. THOMSON.

---

Copies of this patent may be obtained for five cents each, by addressing the "Commissioner of Patents, Washington, D. C."